United States Patent [19]

Dees, Jr. et al.

[11] Patent Number: 5,073,425

[45] Date of Patent: Dec. 17, 1991

[54] POLYVINYL CHLORIDE SURFACE COVERING COMPOSITIONS HAVING REDUCED ELECTRICAL RESISTIVITIES

[75] Inventors: Martin Dees, Jr., Landisville; Richard E. Felter, Lancaster; Deborah L. Musser, Columbia, all of Pa.

[73] Assignee: Armstrong World Industries, Inc., Lancaster, Pa.

[21] Appl. No.: 255,031

[22] Filed: Oct. 7, 1988

[51] Int. Cl.$^5$ .............................................. E04F 15/16
[52] U.S. Cl. ...................................... 428/48; 428/204; 428/518; 428/520; 428/908.8; 428/922
[58] Field of Search ..................... 428/518, 520, 908.8, 428/48, 204, 922

[56] References Cited

U.S. PATENT DOCUMENTS

| | | |
|---|---|---|
| 2,626,876 | 1/1953 | Carnes . |
| 2,626,877 | 1/1953 | Carnes . |
| 2,663,695 | 12/1953 | Perloff . |
| 2,897,170 | 7/1959 | Gruber . |
| 3,132,065 | 5/1964 | Barsy ................................ 428/908.8 |
| 3,188,263 | 6/1975 | Pflauner . |
| 3,905,849 | 9/1975 | Bomboire ............................ 428/204 |
| 4,104,175 | 8/1978 | Martinsson . |
| 4,204,018 | 5/1980 | Bernstein ............................ 428/922 |
| 4,208,696 | 6/1980 | Lindsay ............................... 428/922 |
| 4,301,040 | 11/1981 | Berbeco . |
| 4,409,280 | 10/1983 | Wiley ................................. 428/203 |
| 4,414,260 | 11/1983 | Rzepecki ............................ 428/520 |
| 4,645,717 | 2/1987 | Berbeco . |
| 4,662,514 | 5/1987 | Berbeco ............................. 428/922 |
| 4,699,830 | 10/1987 | White ................................. 428/922 |
| 4,710,415 | 12/1987 | Slosberg ............................. 428/48 |
| 4,746,574 | 5/1988 | Hattori ............................... 428/922 |

FOREIGN PATENT DOCUMENTS 5067457  5/1980  Japan ...................... 428/204

Primary Examiner—Merrell C. Cashion, Jr.
Assistant Examiner—D. S. Nakarani

[57] ABSTRACT

Decoration polyvinyl chloride surface covering structures are described which have antistatic or static dissipative capabilities. Several features are described herein which can be taken advantage of to lower the normal conductivity of the polyvinyl chloride sheet and yet still maintain an attractive or decorative appearance.

22 Claims, 1 Drawing Sheet

Fig. 6

POLYVINYL CHLORIDE SURFACE COVERING COMPOSITIONS HAVING REDUCED ELECTRICAL RESISTIVITIES

BACKGROUND OF THE INVENTION

Field of the Invention

The sensitivity of electronic components and circuit boards to static charge requires the use of anti-static and static dissipative materials. Particularly in the areas where the static sensitive items are being tested, used, manufactured, packaged, and shipped, it is necessary to take steps to prevent the build-up of static charge. In order to protect these electronic components, desirably the materials in the environment should not hold static charge and should permit static electricity to be depleted gradually. It is thus particularly desirable to have antistatic or static dissipative environmental materials. Too little conductivity is undesirable and similarly, a high conductivity would likewise be undesirable.

Vinyl chloride polymers (both homopolymers and copolymers) have been very popular in surface covering compositions of all types. Floors, walls, counterspaces, etc. are frequently covered with decorative polyvinyl chloride sheet compositions. Polyvinyl chloride, however, presents particular problems if antistatic or static dissipative qualities are required. Polyvinyl chloride surface covering compositions without any anti-static additive will generally have surface resistivities of $10^{12}$ ohms/square (sq.) or higher. This surface resistivity is too high for the applications requiring either static dissipative ($10^6$ to $10^9$ ohm/sq.) or anti-static ($10^9$ to $10^{12}$ ohms/sq.) protection. Anti-stat additives are incorporated into materials in order to increase conductivity. Polyvinyl chloride, however, presents particular problems when the PVC must be combined with additives in order to achieve the anti-static and particularly the static dissipative conductivity levels.

Polyvinyl chloride surface covering compositions must contain a stabilizer so that they can be processed at elevated temperatures. Disadvantageously, the quarternary ammonium, salt cationic anti-stat additives tend to interfere with the heat stabilizing function of these metallic additives. Furthermore, discoloration of the polyvinyl chloride is noted when the cationic quarternary ammonium anti-stat and the metallic stabilizers are combined in the composition.

Alternatively, the vinyl formulations can be made using the non-ionic anti-stats. Unfortunately, this significantly limits the amount of conductivity which can be obtained. The non-ionic anti-stats do not improve conductivity as well as the cationic anti-stats.

Another difficulty which is frequently encountered with the vinyl formulations is the surface exudation of the anti-stat. Particularly when the formulations contain both plasticizer and anti-stat additive surface exudation often becomes a problem, especially with larger amounts of each (particularly needed to get static dissipative levels).

The instant invention provides polyvinyl chloride surface covering compositions having anti-static and static dissipative conductivity. The compositions provided are structured to optimize conductivity, but at the same time, problems of surface exudation are avoided. Even more desirably, the instant invention provides compositions which delivered excellent electrical performances, but at the same time, maintain good visual appearance. Compositions are even described herein which have both static dissipative properties and which have a decorative visual effect because of a printed layer in the composition.

The compositions described herein also combine several features which are used to provide lower surface resistivities. The instant sheet compositions can either be fixed (tacked, glued) to the surface or loosely placed on the surface as desired.

SUMMARY OF THE INVENTION

Electrical conductivity is improved in polyvinyl chloride surface covering compositions by maximizing the quarternary ammonium salt anti-stat concentration in the lower, "interlayer" while minimizing the anti-stat concentration in the top, "wear" layer. Along with the cationic quarternary ammonium salt anti-stat additive, the interlayer will also contain the additives usually found in polyvinyl chloride (PVC) compositions. These include a stabilizer and a plasticizer maintained in the interlayer and high filler levels because it has been found that this combination favors good conductivity.

The term "interlayer" is used herein to refer to the lower layer which contains a cationic anti-stat added to the desired polyvinyl chloride formulation, the interlayer is located underneath the wear layer and the print layer, if one is used. The "wear" layer is the top layer of the instant materials which is exposed at its surface.

The amount of cationic anti-stat used in the clear top wear layer is minimized or eliminated and the greater amount is put in the interlayer, thus reducing the unwanted heat-induced yellowing of the top layer. The quarternary ammonium antistat is in the interlayer in an amount effective to increase the static dissipative rate of the wear layer. This is at least about 1 Phr, and preferably at least 3 Phr. This increase in the static dissipative rate is indicated by the measured decrease in surface resistivity. It has furthermore been found that print layers can be used in such compositions between the clear wear layer and the interlayer. Good conductivity will still be achieved even though the print layer is present. In fact, when the print layer is less than about 0.0015 inches (1.5 mils) thick, little or no effect on the electrical conductivity is found. To the contrary, in some preferred embodiments where the interlayer is used with a glass scrim, the use of the rotogravure printing technique allows even a further reduction of surface resistivity.

By controlling the length of the fusion time of the interlayer, resistivity can also be reduced. Specifically, reduction in the fusion time used for the interlayer allows the electrical conductivity to be improved. This combination is preferably taken advantage of in preferred embodiments where the glass scrim is used for added support.

Commonly, polyvinyl chloride formulations without antistat additives have surface resistivities of $10^{12}$ ohms/sq. and higher. Static dissipative ranges can be achieved with the instant compositions which use high amounts of the cationic antistat in the interlayer. Cationic quarternary ammonium anti-stat additives can, if desired, be combined in a top wear layer in an amount less than about 5.5 parts per hundred parts of resin (Phr); in such embodiments the wear layer is pigmented. Further, when a clear top wear layer is used with a print layer, the yellowing effect of the cationic anti-stat at levels less than about 2.5 Phr (greater than 0 to about 2.5 Phr) advantageously is less notable. Even with no antistat in the wear layer, the electrical performance is significantly better than in single layer PVC sheet materials that have non-ionic antistats.

Other factors which can be taken advantage of in order to reduce surface resistivity of the instant compositions include the use of a filler material selected from the group consisting of: alumina trihydrate, zinc oxide, and magnesium oxide. Of these, the best filler has been found to be alumina trihydrate which preferably is used at high concentrations.

In another embodiment the instant invention improves conductivity by adding a small amount of antistat to the wear layer, and controlling the thickness of the wear layer. Further advantages, moreover, are obtained by using adipate plasticizers to provide another reduction in resistivity.

The surface covering compositions described herein are prepared using polyvinyl chloride resins. This includes materials which are both homopolymers and copolymers of vinyl chloride. The term "polymer" thus refers to both homopolymers and copolymers.

Advantageously, by having most or all of the cationic anti-stat material in the interlayer, exudation problems are minimized. High plasticizer levels furthermore can be used in combination with the high anti-stat levels in the interlayer and the exudation effect will be minimized or completely avoided because the interlayer is contained underneath the wear layer. If desired, furthermore, the interlayer can be even more contained and given more support by the use of a permanent carrier.

In one embodiment, a surface covering composition having improved conductivity comprises a sheet material having a clear top wear layer of a polymer of vinyl chloride, said polymer including a stabilizer and a plasticizer, a print layer under the wear layer, and a lower, interlayer of a polymer of vinyl chloride, said polymer including a filler, a stabilizer, a plasticizer, and a quarternary ammonium anti-stat additive, wherein the anti-stat additive is present in the interlayer in an amount greater than about 3 parts per hundred parts of polymer.

In another embodiment, the instant invention is a surface covering composition having improved conductivity which comprises a sheet material having a pigment wear layer of a polymer of vinyl chloride which includes a stabilizer, a pigment, and a plasticizer, and a lower interlayer of a polymer of vinyl chloride which includes a filler, a plasticizer, a stabilizer, and a quarternary ammonium salt anti-stat additive wherein the said anti-stat additive is present in the interlayer in an amount greater than about 3 parts per hundred parts of resin.

DETAILED DESCRIPTION

Figure 1:
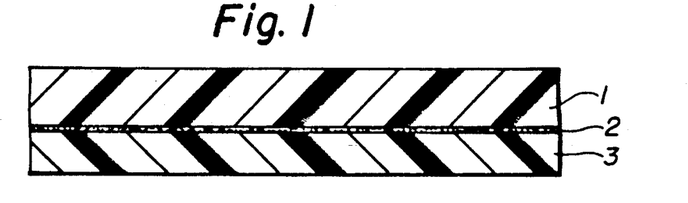
FIG. 1 is a fragmentary cross-section of the vinyl surface covering composition showing wear layer 1, print layer 2, and interlayer 3.
Figure 2:
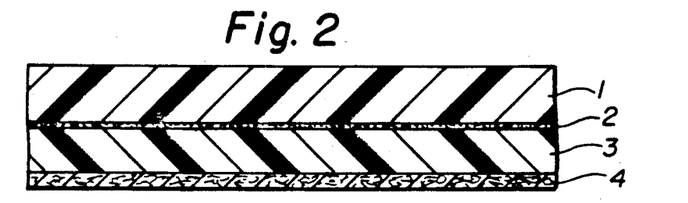
FIG. 2 shows wear layer 1, print layer 2, interlayer 3, and glass scrim 4. In such embodiments with the glass scrim, normally the scrim becomes saturated with the plastisol interlayer applied to it.
Figure 3:
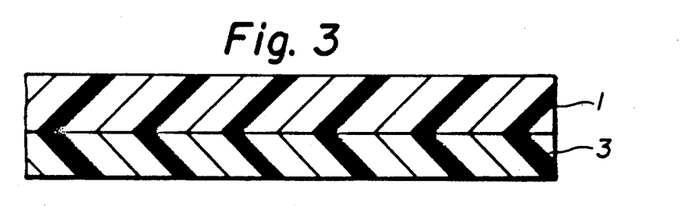
FIG. 3 shows the instant invention in its simplest embodiment which merely has wear layer 1 and interlayer 3. In preferred embodiments, this type of static dissipative surface covering material could include a pigment in either the wear layer 1, in the interlayer 3, or in both layers.
Figure 4:
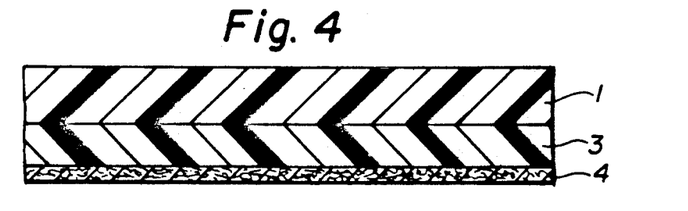
FIG. 4 shows the instant PVC surface covering composition having wear layer 1, interlayer 3, and glass scrim 4. This embodiment could also include a pigment in the wear layer, the interlayer, or in both the wear layer and interlayer.
Figure 5:
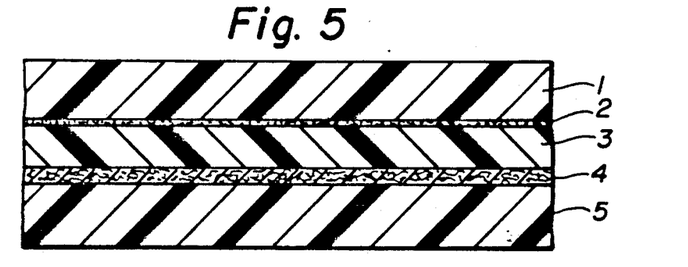
FIG. 5 shows the instant PVC surface covering material having wear layer 1, print layer 2, interlayer 3, glass scrim 4, and a back coating layer 5.
Figure 6:
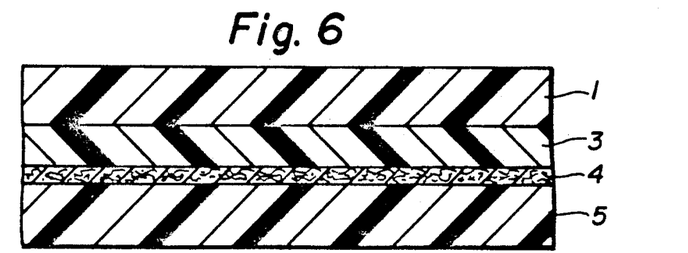
FIG. 6 shows the instant PVC surface covering composition having wear layer 1, interlayer 3, glass scrim 4, and back coating layer 5. This embodiment could also include a pigment in one or more of the layers.

Polyvinyl chloride surface covering material having a lowered electrical resistivity is described herein. One important aspect of this surface covering material is the specific layered structure described. This structure provides the static dissipative and antistatic capabilities in the vinyl material. At the same time, the structure minimizes the unattractive appearances characteristic of the combination of cationic anti-stats with polyvinyl chloride formulations when exposed to heat. The structure further minimizes the undesired effects such as exudation which tends to occur with the high anti-stat levels needed to lower resistivity.

It is therefore an important aspect of the instant invention to minimize the cationic anti-stat needed in the wear layer and instead maximize the amount of cationic anti-stat used in the interlayer. It has been unexpectedly found that print layers can be placed over the interlayer without significantly detrimentally effecting electrical performance. Improved electrical performance is still obtained on the wear layer even though the anti-stat material is in the interlayer underneath both the wear layer and the print layer. If the conductivity required is even lower, say for example, in the static dissipative levels, a small amount of a selected anti-stat material can be added to the wear layer without sacrificing the advantages obtained with the instant structure. Small amounts of the anti-stat will not cause appreciable, unwanted, and unattractive color and will not cause exudation at minimum levels. It has been found that such minimum amounts of cationic anti-stat are preferred rather than using a non-ionic anti-stat since the best surface resistivity and performance is obtained from the small amounts of the cationic anti-stat, although it is permissible to use the non-ionic in the wear layer instead. Most of the reduction in electrical resistivity, however, will be provided by the interlayer and the other optimized features of the instant invention.

Other features discussed herein can also be used to further improve conductivity of the PVC surface covering material. Thus, one or more of the following features can also be included: minimizing the length of the cure time, selecting an electron rich (high electron donor capacity) filler material, using high amounts of the filler material, placing the sheet material on a substrate as a carrier, using a glass scrim carrier as the substrate, selecting an adipate plasticizer for at least part of the plasticizers used to make the vinyl formulation, and finally, the use of the rotogravure printing technique to form the print layer.

Polymers and copolymers of vinyl chloride are popular for use in the preparation of surface coverings materials such as vinyl floors and countertops. Any formulation using vinyl chloride polymers or copolymers is suitable for use with the instant invention. This includes formulations with any one or more of the numerous additives used with vinyl chloride resins. Naturally, the instant surface covering materials would include heat stabilizers and plasticizers. Other additives which could suitably be included, however, are anti-smoke and flame retardants, impact modifiers, hardeners, pigments, processing aids, color and tint modifiers, and lubricants.

The instant static dissipative and antistatic layered structures can also be prepared using and applying the various techniques suitable for making vinyl surface covering materials. The structure and features discussed herein which are designed to maximize the improvement in electrical properties can easily be made by methods and techniques designed to produce vinyl flooring.

Usually the addition of anti-stats to the PVC formulation causes deterioration of the surface properties. These problems are either avoided or minimized in the instant invention, however, since the wear layer either: (1) has no added anti-stat; (2) has only non-ionic anti-stat; or (3) contains a minimum amount of cationic anti-stat. With regard to the third possibility, it has been found that when the lower, static dissipative, levels of resistivity are desired, the cationic anti-stats can be included without sacrificing surface properties if this amount is kept lower than about 5.5 parts per hundred parts of the resin in a pigmented wear layer; and preferably, the cationic anti-stat in the pigmented wear layer is limited to less than about 3.5 parts per hundred parts of resin. For clear wear layers, the amount of cationic antistat in the top wear layer is preferably less than 2.5 Phr and most preferably, less than 1 Phr.

The instant invention can have either a pigmented wear layer with added pigmenting and coloring material or it can have a clear wear layer of PVC (normally a homopolymer) which can be combined with the print layer underneath in order to give any desired decorative effect. In either case, our experimentation supports the position that the thickness of the wear layer can be adjusted to further optimize static dissipation. Non-floor structures can have a wear layer thickness as low as about 1 mil. While, in general, the instant static dissipative or anti-static layered floor structure can be made having wear layers which range in thickness anywhere between from about 0.005 inches to about 0.035 inches. It has, however, been discovered that advantages can be obtained in lower surface resistivities by keeping the wear layer thickness at either the upper or lower end of this range. Thus, preferred wear layer thickness are in the range of from about 0.005 inches to about 0.015 inches or from about 0.025 to about 0.035 inches (about 25–35 mils).

Fillers are frequently included in vinyl compositions. Permissively, fillers can be used with the instant invention and, in fact, in order to completely maximize the reduction of surface resistivity, fillers are called for. Preferred filler materials are selected from the group consisting of: aluminum trihydrate, zinc oxide, and magnesium oxide.

The instant invention also prefers the higher filler levels. It is thus preferred that the amount of filler used is in excess of about 50 parts per hundred parts of resin. A preferred filler level concentration range is from about 50 to about 140 parts per hundred parts of resin (Phr). Most preferably, the filler is used at a concentration in the range of from about 70 to about 125 Phr.

Thermal stabilizers are desirably included in the instant vinyl compositions. These stabilizers will allow the resin compositions to be processed at higher temperatures. These stabilizers can be used in both the wear layer and the interlayer. The combination of the necessarily higher amounts of the cationic anti-stat and the metallic thermal stabilizer can be tolerated in the interlayer. When the cationic anti-stat is used in the wear layer, it is kept at a minimum concentration in order to avoid undesirable interaction with the stabilizer at the surface. If, however, a pigmented wear layer is used, the discoloring associated with this degredation can be masked.

Any PVC thermal stabilizer can be used with the instant compositions. Acceptably, a thermal stabilizer can be selected from anyone of the commercially available organo-metallic thermal stabilizers. One preferred type of thermal stabilizer is the organo-tin compounds. The actual amount of stabilizer used will depend on the particular PVC formulation used. Suitably, stabilizers are used in an amount of from about 0.5 to about 5 Phr.

The anti-stat used in the wear layer could be either ionic or non-ionic, although the non-ionic anti-stats give only marginal improvement. Non-ionic additives which are suitable for the wear layer include a fatty acid ester of ethanol amide, a polyethylene glycol ester, a polyethylene glycol, an ether, a glycerid, a propoxylated alcohol, an ethoxylated alcohol, an alkyl sulfonate, a tertiary amine, and a phosphate ester. Other suitable non-ionic anti-stats also include ethoxylated or propoxylated organic compounds. If non-ionic anti-stats are desired in the wear layer they can suitably be used in amounts less than about 5.5 Phr. A suitable range for the non-ionic anti-stat is from about 2 to about 4 Phr.

Any quarternary ammonium compound is suitable for use with the instant invention as a cationic anti-stat agent, and conveniently, the compounds are commercially available or can be prepared using any of the methods available for the preparation of these salts.

Quarternary ammonium compounds acceptable for use as an anti-stat additive can be represented as:

where each R can, independently be a hydrocarbon moiety, and where $^-Y$ is an anion. The hydrocarbon moieties represented by R can contain atoms selected from oxygen, halogens, sulfur and nitrogen that form other functionalities within the hydrocarbon (such as a carboxyl, an ester, an ether, or amine functionality). The hydrocarbon portion can be linear, branched, and cyclic; saturated, unsaturated, and aromatic. Each R can acceptably have from 1 to 30 carbon atoms. Examples of anions represented by Y are the halides, (Y can be chlorine, bromine, fluorine, or iodine), sulfate, sulfonate, phosphate, hydroxide, borate, cyanide, carbonate, hydrocarbonate, thiocyanate, thiosulfate, isocyanate, sulfite, bisulfate, nitrate, nitrite, oxalate, silicate, sulfide, cyanate, acetate and any of the other common inorganic and organic anions.

A quarternary ammonium anti-stat agent can be selected from the group consisting of: a quarternary ammonium ethoxylated sulfonate, a quarternary ammonium sulfonate, an alkyl quarternary ammonium halide, a quarternary ammonium imidazoline, an aliphatic quarternary ammonium halide, and an alkyl quarternary ammonium alkyl sulfate.

A suitable quarternary ammonium anti-stat agent can be selected from the following classes of quarternary ammonium salts: a $C_2$-$C_{20}$ quarternary ammonim compounds with the hydrocarbon group being saturated or unsaturated, linear or branched; and alkyl benzyl quarternary ammonium compound; a pyridinium quarternary ammonium compound; an ethoxylated quarternary ammonium compound; a propoxylated quarternary ammonium compound and an imidazoline quarternary ammonium compounds. Preferred alkyl benzyl quarternary ammonium compounds are the $C_1$-$C_4$ alkyl dimethyl benzyls and the $C_1$-$C_4$ dialkyl methyl benzyls. A preferred pyridinium quarternary is cetyl pyridinium. Preferred ethoxylated quats are the ethoxylated $C_2$-$C_{10}$ quat. The $C_2$-$C_{20}$ allylic quats are also preferred. A specific preferred salt is ethyl bis(plyethoxyethanol) alkyl ammonium-ethylsulfate; also preferred is a fatty dimethyl ethyl ammonium ethyl sulfate.

The quarternary ammonium anti-stat agent is used in the interlayer in an amount effective to reduce the surface resistivity of the instant PVC surface covering material. The specific amount of anti-stat agent used in the interlayer will depend upon the level of resistivity desired for the product. If the product application calls for static dissipative conductivity levels, higher amounts of anti-stat agent must be used. If, no the other hand, the product application calls for antistatic capabilities, then less anti-stat agent is used in the interlayer (greater than 1 Phr). When the application merely calls for antistatic resistivities, the wear layer might not have any added antistat at all, the desired, effective amount being in the interlayer. A quarternary ammonium salt anti-stat additive can be used in the interlayer in an amount effective to provide surface resistivities in the anti-static ranges (from $10^9$ to $10^{12}$ ohms/sq.) or it can be used in preferred embodiments an amount effective to give surface resistivities in the static dissipative range (from $10^6$ to $10^9$ ohms/sq.).

A preferred concentration range for the cationic anti-stat agent in the interlayer is from about 4.5 to about 20 phr. For the higher conductivities, the quat anti-stat agent most preferably is used in an amount of from about 8 to about 20 Phr in the interlayer. For surface resistivities of about $10^9$ or better, the quat antistat concentration in the interlayer is at least about 10 Phr.

A carrier substrate can also be used with the instant layered compositions in order to further reduce the surface resistivities. Advantageously, these carrier substrates will also serve to add reinforcement when the interlayer contains the higher levels of antistat. These carrier substrates also serve to give better handling properties to the sheet material. This allows easier installation, transportation, etc. for the surface covering materials.

The carrier substrate material used with the instant layered compositions can be a temporary carrier substrate, which is designed to be removed at a certain point in time before installation. Such a temporary carrier substrate, for example, would be a release paper. A release paper can be temporarily put on any single layer before the addition of another layer or release paper would suitably be put underneath the interlayer.

A permanent carrier substrate can also be used. This provides a further permanent reduction in resistivity which has been found with some of these materials, and permanent substrates also add reinforcement which might be desired for the surface convering material especially when high anti-stat levels are used in the interlayer.

Suitable permanent carrier substrates which could be used with the instant surface covering compositions include: a glass scrim, woven fiber, a non-woven fiber mat, or a plastic sheet. One substrate found to be particularly desirable since it has the capability of further reducing surface resistivity is the glass scrim (fiberglass). This preferred carrier substrate could be either a woven or a non-woven glass sheet material. Of the two, the non-woven fiberglass scrim is most preferred.

When a permanent carrier is used, a back coating layer of a PVC formulation can also be added. Such back coating layers are preferably from about 15 to about 40 mils in thickness. If desired, antistat (cationic or non-ionic) can be added to this layer also; acceptably in an amount less than about 10 Phr. Preferably, the antistat is used in an amount of from about 1 to about 10 Phr. More preferably, the antistat in this layer is about 5 Phr or less.

Techniques used in preparing layered vinyl sheet materials can be applied to form the instant compositions. Generally, in forming the layers, polyvinyl chloride resins are mixed with plasticizer (and any other selected or desired additive) to form a plastisol formulation. The plastisol will have a desired viscosity and other desirable characteristics suchg as good handling properties. The plastisols are easily laid out in layers and then cured by fusion. After fusion, the interlayer can be printed if desired. It is then coated with the plastisol wearlayer which is then fused.

Any suitable plasticizer can be selected to be used with the instant compositions. Advantageously, high concentrations of the plasticizer can be used in the interlayer along with the cationic anti-stat agent.

Suitable plasticizers which can be used can be selected from the group consisting of: a phthalate ester, a phosphate ester, an epoxidized soybean oil, and an adipate plasticizer. Preferably, at least two plasticizers selected from this group are used.

More preferably, at least one of the plasticizers selected will be an adipate plasticizer, since these plasticizers have the capability of reducing electrical resistivity. Even more preferably, the plasticizer used or the instant composition will be a mixture of adipate plasticizer and a phthalate ester plasticizer.

When two or more different plasticizers are used, one of them being an adipate plasticizer, the adipate plasticizer is preferably used in a maximum amount of about 50% by weight (wt.) of the total wt. of plasticizers used. More preferably, the adipate plasticizer will be used in an amount of from about 20 to about 30% by wt. of the total amount of plasticizer.

Generally, the amount of plasticizer used will depend on the formulation selected. Suitably, however, the wear layer formulations can have plasticizer in an amount of from about 20 to about 50 Phr, a preferred plasticizer concentration in the wear layer being from about 29 to about 40 Phr. The interlayer can acceptably have plasticizer in an amount of from about 20 to about 80 Phr, and preferably, the interlayer has plasticizer in an amount of from about 40 to about 60 Phr.

One of more desirable features of the instant invention is the capability of providing an attractive, decorative surface in a vinyl surface covering material which is either anti-static or static dissipative. In some embodiments of the instant invention, this is provided by using pigments which can be added to the wearlayer, the interlayer, or both layers for a decorative effect.

One of the more interesting embodiments of the instant invention, however, provides a print layer underneath the clear polyvinyl chloride wear layer. It has been found that the reduced electrical resistivity will not be destroyed by including the print layer with the instant compositions even though no antistats are included in the printing ink.

Suitable printing techniques which can be used to add the print layer to the instant compositions are the rotogravure process and a heat transfer process. Of these two techniques, the rotogravure process can even improve the electrical performance for embodiments having the glass scrim. Rotogravure is thus preferred. The preferred print layer is about 0.0015 inches thick or less. Acceptably, the interlayer is from about 10 to about 40 mils thick.

In forming the instant layered compositions, the plastisol layer is formed followed by fusion. In fusion, the layers are subjected to fusion temperatures. While fusion procedures known and used in the art can be used with the instant invention, generally the fusion temperatures which are used for a layer are in the range of from about 300° to 400° F. An acceptable fusion time for the wear layer or back coat layer is about three minutes or less to minimum of about 45 seconds (sec.); preferably, about 2.5-about 0.75 minutes; most preferably, about 2-about 0.75 minutes.

The fusion temperature and the length of time that the interlayer is at this temperature can be moderated if a further improvement (reduction) in conductivity is desired. Since the layer is an interlayer (underneath the wearlayer), shorther fusion times can be tolerated. In order to further decrease resistivity and avoid discoloration, the instant compositions can be made by a process comprising (1) laying on a permanent carrier substrate an interlayer of a plastisol which includes a polymer of vinyl chloride, a filler, a stabilizer, a plasticizer, and a quarternary ammonium salt anti-stat additive, wherein the anti-stat additive is present in the interlayer in an amount of at least 1 part per hundred parts of polymer, and (2) fusing the interlayer for a period of from about one minute to about 30 seconds at a temperature in the range of from about 275° to about 299° F.; and then (3) laying on top of the interlayer, a wear layer of a plastisol formulation that includes a polymer of vinyl chloride, a stabilizer, and a plasticizer; and then (4) fusing the wear layer for a period of from about three minutes to about 45 seconds at a temperature of from about 300° F. to about 400° F.

The preferred processes will shorten the wear layer fusion time when using one or more of the following: (a) wearlayer fusion temperatures at about 350°-about 400° F. (preferably the time is about 2.5-about 0.75 minutes or more preferred about 2.0-about 0.75 minutes), (b) when greater than about 3 Phr cationic antistat is in the interlayer; (c) with a wear layer thickness of about 25 mils or less. A preferred fusion time period is from about 2.5 to about 0.75 minutes; a more preferred period from about 2 to about 0.75 minutes.

If desired, the composition can be put on a temporary carrier such as a release paper, a back-coating layer can also be added by forming it on the exposed surface of the permanent carrier. This process is particularly useful when the interlayer has about three or more parts of the quaternary ammonium antistat. Interlayer discoloration is avoided by keeping fusion temperatures less than 300° F. and having a short fusion time. The interlayer which has the high concentrations of the quat antistat is not directly exposed to harsh conditions that cause discoloration. Surprisingly, however, the wear layer, and even a desired back coat layer can be fused at these harsh, higher temperatures without the discoloration developing in the interlayer. Print layers can also be used. The instant process is also recommended where pigments are used in the interlayer. The instant process can provide a true pigment color, not affected by discoloration.

In other preferred cases, the fusion time for the interlayer is a maximum of about 1.5 minutes or less (to a minimum of about 30 sec.); a preferred fusion temperature for the interlayer or the back coat layer is from about 300° to about 375° F. More preferably, the fusion temperature used for the interlayers or the back coat layers should be from about 300° F. to about 350° F. and this should be done for a relatively short fusion time less than about one minute to a minimum of about 30 seconds. When the time of exposure of the interlayer to the heat of fusion is even further reduced say to an amount less than about 45 seconds (to a minimum of about 30 sec.), an even greater improvement in surface resisitivities is seen.

If desired, in order to give further reinforcement to an interlayer having relatively short fusion time and/or a reduced fusion temperature, a suitable carrier substrate can be added. The presence of the wear layer on the interlayer protects sensitive anti-stat agents from extremes of temperature during further processing.

The instant compositions can even be further decorated by embossing the wear layer surface. If desired, this could be accomplished by passing the sheet material under a roller using heat and pressure to impart embossing on the wear layer surface. The embossed pattern can have various forms which could be decorative, non-slip, or a combination of the two.

The instant invention can also be readily understood from the examples that follow. These examples are offered to illustrate the instant invention and thus, they should not be used to limit it. All parts and percentages are by weight unless otherwise indicated.

PROCEDURE FOR MEASUREMENT OF SURFACE RESISTIVITY

All of the surface resistivity measurements that appear in the following experiments were conducted in accordance with the test ASTM D-257 (ASTM—American Standards for Testing Materials). The equipment used to take the measurements was an Electrotech Systems Inc., Resistivity Probe—Model 802. In taking all of the measurements, an 11 lb. weight was positioned on the probe while it rested on the surface being measured. A resistance meter with a direct digital read out (Dr. Theiding Milli—To 2 Wide Range Resistance Meter) was connected to the probe to give the direct digital data valve. The tests that were done at 50% RH (Relative Humidity) were done in a room controlled at 50±1% RH and 23±1° C. (Centigrade) temperature. The tests conducted at 15% RH were done in a dry box controlled at 14±2% RH and 23±1° C. temperature.

EXAMPLE 1

A layered polyvinyl chloride floor covering was prepared in accordance with the following procedure.

An interlayer was formed on a glass scrim. The interlayer plastisol was made by mixing 100 parts of polyvinyl chloride resin in a Sunbeam mixer for one minute along with the following other dry ingredients: 7.2 Phr of quarternary ammonium anti-stat (Larostat-477); and 90 Phr of the filler alumina trihydrate; CBA Chemicals Ltd. Approximately one-third of the following liquid mixture was then added: 2 Phr of dibutyl maleate tin stabilizer (Argus) M-275; 33 Phr of ethylene oxide adipate, plasticizer (Bisoflex-124); 25 Pht di-2-ethylhexylphthalate, plasticizer; 5 Phr of expoxidized soybean oil, plasticizer, stabilizer; and 12 Phr of isobutyrate, flexibilizer, plasticizer, and viscosity reduction. After adding this rotation of the liquid mixture, blending continued until a plastisol formed which has a smooth taffy-pulling consistency.

After this high shear plastisol was formed, the addition of filler to the high shear began. The filler used was alumina trihydrate and a total of 90 Phr was added to the interlayer. The addition of this filler was gradual with intermittent additions of the rest of the liquid plasticizer mixture. As the addition of the these ingredients proceeded mixing continued so that a high shear plastisol state was maintained.

After all of the filler and liquid plasticizer mixture was combined with the plastisol, mixing continued for about four minutes to form a smooth blend of the plastisol.

The 100 parts of resin was a combination of two types of polyvinyl chloride resin; 80 parts Vestolit B7201 (from Huls AktiengesellschAft) and 20 parts of Vinnol C65V (from Wacker Chemie G.m.b.H.).

This interlayer plastisol formulation was formed into a layer using a Warner-Mathis AG oven and draw down apparatus.

This interlayer was formed on a glass scrim (Schulle Fho 55-1) and fused. The fusion condition was 375° F. for one minute.

A print layer was put on top of the interlayer using the the rotogravure printing technique.

A clear layer was formed using polyvinyl chloride resin (obtained from Occidental Chemical) resin 1734 in an amount of 100 parts by weight. The resin was blended for about one minute in a Sunbeam mixer along with one part by weight of the quarternary ammonium salt anti-stat (Larostat 477). Next, an amount of approximately one-third of the following liquid mixture was added to the mixer: 2 parts by weight of dibutyl maleate tin stabilizer (M-275 by Argus); 12 parts by weight of ethylene oxide adipate plasticizer (Bisoflex 124); 5 parts by weight of epoxidized soybean oil plasticizer; 16 parts by weight of di-2-ethylhexyl phthalate (plasticizer); and 11 Phr of isobutyrate (flexibilizer and viscosity reduction).

Blending of this mixture continued until a plastisol was formed which had a smooth taffy-pulling consistency (high shear). The rest of the liquid containing the plasticizer was then added while mixing of the plastisol continued. Using the Warner-Mathis AG oven and draw down apparatus, the wear layer was formed on top of the printed interlayer and fused at 375° F. for 1.5 minutes.

A back coating was then placed on top of the glass scrim which was on the bottom of the interlayer. The back coating was another polyvinyl chloride plastisol formulation. One hundred parts of polyvinyl chloride resin was used. This 100 parts of resin contained 80 parts of polyvinyl chloride (obtained from Huls Aktiengesellschart) (Vestolit B-7201) and 20 parts of polyvinyl chloride (obtained from Walker Chemie G.m.b.H.) (Vinnol C-65V). This 100 parts resin was placed in a blender along with 5 parts by weight of the quarternary ammonium salt cationic anti-stat (Larostat 477). This mixture was blended for about one mixture in the Sunbeam mixer. Next, approximately one-third of the following liquid mixture was added: 20 parts by weight of isobutyrate (flexibilizer and viscosity reduction); 5 parts by weight of epoxidized soybean oil (plasticizer); 50 parts by weight of di-2-ethylhexyl phthalate (plasticizer); and 2 parts by weight of dibutyl maleate tin stabiizer (Argus M-275). This mixture was then blended until a high shear plastisol was formed.

Beginning with a small portion of the alumina trihydrate filler, intermittent additions of the filler and then the liquid mixture of plasticizer was added to the plastisol high shear formulation. After all of the 90 parts by weight of alumina trihydrate filler and all of the liquid mixture containing the plasticizer had been added to the plastisol, mixing of the plastisol continued until a smooth blend of the plastisol which did not have any lumps was obtained.

This plastisol formulation was laid down forming the back coating layer on the glass scrim, using a Warner-Mathis AG oven and draw down apparatus. This back coating layer was then fused by heating the composite at 300° F. for two minutes.

Usint the procedure previously described, the surface resistivity of the vinyl floor covering sheet was measured. The surface resistivity was found to be $3 \times 10^8$ ohm/sq. at 50% RH and $2 \times 10^9$ ohms/sq. at 15% RH.

PLASTISOL MIXING PROCEDURE

The plastisol compositions used to make the layers described in Examples 2-10 were prepared using the following procedure..

All of the liquid ingredients in each formulation were mixed together to form one liquid mixture.

Except for the filler, the dry ingredients were mixed together in a Sunbeam mixer for one minute. Then, a portion of the liquid mixture was added and mixing continued until the plastisol was smooth with a taffy-pulling consistency (a "higher shear"). The portion of the liquid (liq.) added was the amount which was needed to get the high shear plastisol, generally, this amount was approximately ⅓ of the total amount of liquid.

If no filler was used in the formulation, then the remainder of the liquid ingredient mixture was then added and the plastisol mixing continued for ten minutes.

When fillers were used in the formulation, the addition of fillers to the high shear plastisol began at the point. The filler was added gradually with intermittent additions of the liquid ingredient mixtures so that the high shear plastisol state was maintained. After all of the filler had been added, mixing continued for a minimum of four minutes until a smooth blend without lumps was obtained.

PLASTISOL SHEET FORMATION AND FUSION

In the following examples, a Werner-Mathis AG oven and draw down apparatus was used to draw down the plastisol formulation into a film and gauge the deposition thickness, followed by thermal fusion.

When release paper was used as the substrate on which the plastisol was deposited, the paper was supplied by Warren Corporation; the glass scrims, used as a preferred substrate, were Schulle FHO 55-1 glass scrims.

EXAMPLE 2

In this example, the performance of both cationic and non-ionic anti-stat additives are tested in a vinyl film formulation and compared to a film of the same formulation having no anti-stat at all.

Using the mixing and sheet formulation procedures previously described, eight separate films were prepared on a release paper substrate. The following ingredients and amounts were used in all of the films:

| Dry Ingredients | Parts by Weight |
|---|---|
| PVC Resin (Vestolit B7021) | 80 |
| PVC Resin (Vinnol C65V) | 20 |
| Alumina Trihydrate (Filler) | 90 Phr |

| Liquid Ingredients | Parts by Weight (Per 100 Parts of Resin) |
|---|---|
| 2,2,4-trimethyl-1,3-pentanediol mono-isobutyrate, (flexibilizer and viscosity reduction) | 20 |
| Di-2-ethylhexyl phthalate (Plasticizer) | 50 |
| Epoxidized Soybean Oil (Plasticizer, Stabilizer) | 5 |
| Dibutyl Maleate Tin (M-275) (Organotin stabilizer) | 2 |

Of the eight film samples prepared, film sample 1 did not have any anti-stat additive. The other seven films all had 12 parts by weight of the antistat additive indicated below for each film sample. The films color and appearance and the surface resistivity measurements are also given below in Table 2.

The films had a thickness of 0.012", and the fusion conditions were: 375° F. for 1.5 minutes.

Sample 1—No anti-stat
Sample 2—Larostat 477—A quarternary ammonium (dry)
Sample 3—Larostat 264A—A quarternary ammonium (dry)
Sample 4—Variquat CE100—A quarternary ammonium (dry)
Sample 5—Varstat 10—Ethoxylated isostearyl alcohol (liq.)
Sample 6—Nostastat FE-20—Fatty acid ester (dry)
Sample 7—Markstat AL-26—A quarternary ammonium (liq.)
Sample 8—AtMer 16—A tertiary amine (dry)
Sampled 2-8 all had the anti-stat at 12 PhR.

TABLE 2

| | Film Sample No. | | | |
|---|---|---|---|---|
| | 1 | 2 | 3 | 4 |
| Appearance | White Trans. | Slight Yellow | Yellow | Dark Yellow |
| Surface Resistivity 15% RH (ohm/sq) | $1.5 \times 10^{12}$ | $4.9 \times 10^9$ | $3.4 \times 10^9$ | $6.2 \times 10^9$ |
| Surface Resistivity 50% RH (ohm/sq) | $4.7 \times 10^{10}$ | $1.9 \times 10^8$ | $2.6 \times 10^8$ | $1.3 \times 10^8$ |

| | Film Sample No. | | | |
|---|---|---|---|---|
| | 5 | 6 | 7 | 8 |
| Appearance | White | White Trans. | White Bubbles | White Cloudy |
| Surface Resistivity 15% RH (ohm/sq) | $1.6 \times 10^{10}$ | $3.7 \times 10^{10}$ | $1.7 \times 10^{10}$ | $5.6 \times 10^{10}$ |
| Surface Resistivity 50% RH (ohm/sq) | $2.8 \times 10^9$ | $4.3 \times 10^9$ | $5.6 \times 10^8$ | $2.9 \times 10^9$ |

Trans. = Translucent

The superiority of the cationic quarternary ammonium anti-stat additive is shown in the table above. The lowest resistivity levels are found in the vinyl sheets having the quat. (quarternary ammonium) anti-stat.

Unfortunately, however, as the above table also shows, that the quat anti-stats tend to coloring and appearance problems. Such "yellowing problems" are encountered under fusion conditions needed in the wear layers when the cationic additives are combined in polyvinyl chloride formulations having the organometallic stabilizers.

With the instant surface-covering systems, however, the above vinyl sheets are used as an interlayer permits the undesirable appearance to be hidden by features such as a print layer or a decorated wear layer. This would be especially important for applications where a pleasing appearance is an important feature.

Alternatively, yellowing could be avoided or reduced in the interlayer by lowering its fusion temperature to from about 275°–about 299° F. at the reduced time interval (about 1 minute–about 30 seconds). It has been discovered that a wear layer can be fused at harsh conditions (300°–400° F. at about two minutes or less to about 45 seconds) over such an interlayer without yellowing the covered interlayer.

EXAMPLE 3

This example demonstrates that the filler concentration is increased in order to reduce the surface resistivity of the vinyl surface covering sheet.

Using the previously described mixing and forming procedures, four films were prepared. One did not have a filler and the other three had the same filler at the different levels indicated below in Table 3, otherwise, the films were substantially identical. The ingredients and their amounts are indicated below. The resistivity is indicated in Table 3 which also gives the filler concentration and the sample designation number. All of the films were 0.012 inches thick drawn onto release paper, and fused at 375° F. for 1.5 minutes.

| Dry Ingredients | Parts by Weight |
|---|---|
| PVC Resin (Vestolit B7021) | 80 |
| PVC Resin (Vinnol C65V) | 20 |
| Filler-(For amounts in Phr, see Table) | |
| Antistat-quarternary ammonium salt - (Larostat 477) | 12 Phr |

| Liquid Ingredients | Parts by Weight (Based on 100 parts Resin) |
|---|---|
| 2,2,4-trimethyl-1,3-pentane diol mono-isobutyrate, (flexibilizer and viscosity reduction) | 20 |
| di-2-ethylhexyl phthalate (Plasticizer) | 50 |
| Epoxidized Soybean Oil (Plasticizer, Stabilizer) | 5 |
| dibutyl maleate Tin (M-275) (Organotin stabilizer) | 2 |

TABLE 3

| | Film Sample No. | | | |
|---|---|---|---|---|
| | 9 | 10 | 11 | 12 |
| Alumina trihydrate filler (in Phr) | 0 | 60 | 90 | 120 |
| Surface Resistivity 15% RH (ohm/sq) | $8.5 \times 10^9$ | $6.0 \times 10^9$ | $4.9 \times 10^9$ | $3.8 \times 10^9$ |
| Surface Resistivity 50% RH (ohm/sq) | $7.8 \times 10^8$ | $2.9 \times 10^8$ | $1.9 \times 10^8$ | $1.3 \times 10^8$ |

EXAMPLE 4

In this example, the influence which three different fillers have on electrical resistivity is shown. Three films were prepared using the mixing and sheet formation procedures previously described except for the filler used. The films were identical. All three films were 0.012" thick on release paper and were fused at 192° C. for 1.5 minutes.

The ingredients and their amounts are indicated below; the particular filler type used for each film and the resistivity measured for it is given in Table 4.

| Dry Ingredients | Parts by Weight |
|---|---|
| PVC Resin (Vestolit B7021) | 80 |
| PVC Resin (Vinnol C65V) | 20 |
| Filler | 90 Phr |
| Antistat-quarternary ammonium salt (Larostat 477) | 12 Phr |

| Liquid Ingredients | Parts by Weight (Based on 100 parts Resin) |
|---|---|
| 2,2,4-trimethyl-1,3-pentane diol mono-isobutyrate | 20 |
| di-2-ethylhexyl phthalate | 50 |
| Epoxidized soybean oil | 5 |
| dibutyl maleate tin (M-275) (Organotin stabilizer) | 2 |

TABLE 4

| | Film Sample No. | | |
|---|---|---|---|
| | 11 | 13 | 14 |
| Filler | $Al_2O_3 \cdot 3H_2O$ | $CaCO_3$ | Wollastonite |
| Surface Resistivity 15% RH (ohm/sq) | $4.9 \times 10^9$ | $7.5 \times 10^9$ | $5.2 \times 10^9$ |
| Surface Resistivity 50% RH (ohm/sq) | $1.9 \times 10^8$ | $7.5 \times 10^8$ | $2.1 \times 10^8$ |

EXAMPLE 5

In this example, the performance of the plasticizer di-2-ethyl hexyl phthalate is contrasted with a plasticizer mixture containing the plasticizer dioctyl adipate. Film sample 2 of Example 2 was used for this comparison. Film sample 15 for the comparison was prepared using the same mixing and sheet forming procedure as was used to prepare film number 2, except that film sample 15, had a mixture of the plasticizers indicated below. Film sample 2 was otherwise identical to Film Sample 15.

| Dry Ingredients | Parts by Weight |
|---|---|
| PVC Resin (Vestolit B7021) | 80 |
| PVC Resin (Vinnol C65V) | 20 |
| Filler | 90 Phr |
| Antistat - quarternary ammonium - Larostat 477 | 12 Phr |

| Liquid Ingredients | Parts by Weight (Based on 100 parts resin) |
|---|---|
| 2,2,4-trimethyl-1,3-pentane diol mono-isobutyrate | 20 |
| di-2-ethylhexyl phthalate | 25 |
| Dioctyl Adipate | 25 |
| Epoxidized soybean oil | 5 |
| Dibutyl maleate tin (M-275) (Organotin stabilizer) | 2 |

Surface Resistivity Measurements are given below

TABLE 5

| | Film Sample No. | |
|---|---|---|
| | 2 | 15 |
| At 15% RH Surface Resis. | $4.9 \times 10^9$ | $2.8 \times 10^9$ |
| At 50% RH Surface Resis. | $1.9 \times 10^8$ | $2 \times 10^8$ |

(Resistivity given in ohm/square.)

The above data supports a preference in favor of the adipate plasticizers for polyvinyl chloride compositions having static dissipative and anti-static applications.

EXAMPLE 6

Two different types of substrates was used. A comparison of their effect on electrical performance at different fusion times were also made.

The plastisol composition used in this example was identical to Film Sample No. 15. The mixing and sheet formation procedure described previously were also used. The film thickness used was 12 mils, and the fusion temperature was 192° C. The different fusion times used for each film are indicated in the Table below under cure time.

| | Surface Resistivity ohm/sq | | | |
|---|---|---|---|---|
| | Glass Scrim | | Release Paper | |
| Cure Time (min.) | 15% RH | 50% RH | 15% RH | 50% RH |
| 0.5 | $5.7 \times 10^8$ | $5.7 \times 10^7$ | $1.5 \times 10^9$ | $1.5 \times 10^8$ |
| 0.75 | $7.5 \times 10^8$ | $7.7 \times 10^7$ | $1.5 \times 10^9$ | $1.1 \times 10^8$ |
| 1.0 | $1.2 \times 10^9$ | $8.6 \times 10^7$ | $1.6 \times 10^9$ | $1.4 \times 10^8$ |
| 1.5 | $1.7 \times 10^9$ | $7.7 \times 10^7$ | $1.3 \times 10^9$ | $1.3 \times 10^8$ |

EXAMPLE 7

Three separate film samples were prepared using the formulation, procedure, thickness setting, cure time, etc. which was used to prepare Film Sample No. 15. Two different printing techniques were used on the films. The surface resistivities were measured before and after printing and are shown below. Film Sample A was decorated by transferring a design from a release paper using a heat transfer method. Film Samples B and C were decorated with a design using rotogravure direct printing of the film surface. In all three cases, the printing layers contained no added anti-stats.

TABLE 7

| | | | Surface Resist. 50% RH (ohm/sq) | |
|---|---|---|---|---|
| Sample | Substrate | Printing Technique | Before Printing | After Printing |
| A | Release Paper | Heat Transfer | $1.5 \times 10^8$ | $1.5 \times 10^8$ |
| B | Release Paper | Rotogravure | $1.5 \times 10^8$ | $2.0 \times 10^8$ |

TABLE 7-continued

| Sample | Substrate | Printing Technique | Surface Resist. 50% RH (ohm/sq) | |
|---|---|---|---|---|
| | | | Before Printing | After Printing |
| C | Glass | Rotogravure | $8.6 \times 10^7$ | $8.0 \times 10^7$ |

Heat Transfer Conditions - 300° F. for 1.5 minutes
Rotogravure Print - Overall - 601 mil/inch plate The above data shows that for all three samples, the printing layer had substantially no undesired effect on the resistivity. In the case of the rotogravure technique for the glass scrim based film sample No. 9 the resistivity even decreased after printing.

EXAMPLE 8

Examples 2-7 compare film samples that are interlayer-type materials; this example shows the preparation and resistivities of different wear layer formulations.

In the preparation of these wear layers, several different anti-stat additives were used; and a comparison was made to a duplicate film having no anti-stat additive (Sample 16). Table 8A shows the surface resistivity of the wear layers themselves on release paper and Table 8B shows the surface resistivities of the wear layers on an interlayer film composition identical to Film Sample No. 15 (described in Example 5) on a glass scrim.

using the mixing and film formation procedures previously described, seven films were prepared on a release paper. The following ingredients and amounts were used in all of the films:

| Dry Ingredients | Parts by Weight |
|---|---|
| Polyvinyl Chloride (PVC-Resin 1734) | 100 |
| Alumina Trihydrate (Filler) | 90 |

| Liquid Ingredients | Parts by Weight Based on 100 Parts Resin |
|---|---|
| 2,2,4-trimethyl-1,3-pentane diol mono-isobutyrate | 20 |
| Di-2-ethylhexyl phthalate | 25 |
| Dioctyl Adipate | 25 |
| Epoxidized Soybean Oil | 5 |
| Dibutyl maleate tin (M-275) (Organotin stabilizer) | 2 |

The cure conditions used for the films were 192° C. for 1.5 minutes.

FILM SAMPLES AND ANTISTAT USED

16—None
17, 18 and 19—Quarternary ammonium salt Larostate 477-ethoxylated fatty dimethyl ethylammóniumethosulfate
20—(Al-15) A non-ionic anti-stat in a 67% solution of isopropyl alcohol (liquid)
21—(At MER-163)—A tertiary amine (dry)
22—Ethoxylated isostearyl alcohol (liquid and non-ionic)

TABLE 8B

Wear Layer Films Coated Over Interlayer Formulation No. 14 on Glass Scrim

| | Film Sample No. | | |
|---|---|---|---|
| | 16 | 17 | 18 |
| Surface Resist. 15% RH (ohm/sq.) | $3.4 \times 10^9$ | $2.6 \times 10^9$ | $2.6 \times 10^9$ |
| Surface Resist. 50% RH (ohm/sq.) | $1.8 \times 10^9$ | $1.8 \times 10^9$ | $6.3 \times 10^8$ |

| | Film Sample No. | | |
|---|---|---|---|
| | 19 | 21 | 22 |
| Surface Resist. 15% RH (ohm/sq.) | $2.0 \times 10^9$ | $4.3 \times 10^9$ | $2.1 \times 10^9$ |
| Surface Resist. 50% RH (ohm/sq.) | $5.6 \times 10^8$ | $1.2 \times 10^9$ | $1.1 \times 10^9$ |

It can be noted that in every case, Table 8B shows the surface resistivity to be significantly lower with the interlayer. It is also very significant that wear layer No. 16, which contained no added antistat, produced a surface resistivity value in the composite almost three orders of magnitude lower than in the free film (compare Table 8A to 8B). This very dramatically shows the importance of the interlayer to electrical performance of the composite. Even higher levels of anti-stat (greater than 12 parts) can be used in the interlayer for further improvement.

In addition to this, the electrical performance in PVC formulations is improved but the effect of added antistat especially on the visual performance of the product is minimized. The amount of antistat in the top layer is either reduced or completely eliminated. Thus, with one instant invention, if a quarternary ammonium antistat is used in the wear layer, that amount is always less then the amount in the interlayer. Using the instant composition, electrical properties are significantly better with cationic antistats increased in the interlayer than the normal procedure to circumvent color formation by using the non-ionic antistats.

The level of surface resistivity achieved by the various compositions shown as a whole in all of these examples, moreover, emphasizes and demonstrates that the amount of cationic quarternary ammonium salt anti-stat agent added to the interlayer can be controlled in order to vary the surface resistivity of the instant compositions to the desired level. It is very easy to increase or decrease the amount of antistat in the interlayer. Higher levels of anti-stat, for example, can be used in order to achieve the surface resistivities in the range of about $10^9$ down to about $10^7$; in excess of 10 Phr will be needed for most quats. If higher resistivities are desired, thus providing antistatic compositions instead of static dissipative compositions, less antistat agent (about 1- about 10 Phr) could be used. As little as 1 Phr of the cationic antistat will be effective to give some reduction in the surface resistivity, especially when this is combined with other resistivity reducing factors such as a

TABLE 8A

| | Film Sample No. | | | | | | |
|---|---|---|---|---|---|---|---|
| | 16 | 17 | 18 | 19 | 20 | 21 | 22 |
| Antistat Phr | — | 1 | 2.4 | 4.8 | 4.8 | 4.8 | 4.8 |
| Surface Resist. 15% RH (ohm/sq.) | $1.2 \times 10^{12}$ | $1.2 \times 10^{12}$ | $6.3 \times 10^{10}$ | $4.4 \times 10^{10}$ | $1.7 \times 10^{10}$ | $2.5 \times 10^{11}$ | $3.9 \times 10^{11}$ |
| Surface Resist. 50% RH (ohm/sq.) | $8.6 \times 10^{12}$ | $1.5 \times 10^{11}$ | $3.3 \times 10^{10}$ | $1.5 \times 10^{10}$ | $2.2 \times 10^{11}$ | $5.5 \times 10^{10}$ | $5.1 \times 10^{11}$ | glass scrim carrier or a combination of plasticizers including an adipate.

EXAMPLE 9

In this example three different wear layer thicknesses were tried, thus preparing three samples each of two different wear layer film formulations (Nos. 16 and 18). The interlayer used for all samples was Film Sample No. 15 on a glass scrim. The formulations described for film sample 16 and 18 were used to prepare the six wear layer films in the three different thicknesses on interlayer 15.

The interlayer was applied to a glass scrim in a thickness of 20 mils and this was fused at 280° F. for 1.0 minutes. The wear layer was applied to the interlayer at a thickness of 28 mils (using a draw down bar of proper gauge). The wear layer was then subjected to fusion at 375° F. for 1.5 minutes.

TABLE 9

Effect of Wear Layer Thickness on Electrical Performance

| Film Thickness in mils | Surface Resistivity ohm/sq | | | |
|---|---|---|---|---|
| | Film No. 16 | | Film No. 18 | |
| | 15% RH | 50% RH | 15% RH | 50% RH |
| 10 | $2.1 \times 10^{10}$ | $2.1 \times 10^{10}$ | $2.0 \times 10^9$ | $1.4 \times 10^9$ |
| 20 | $2.0 \times 10^{10}$ | $1.8 \times 10^{10}$ | $3.1 \times 10^9$ | $1.7 \times 10^9$ |
| 30 | $4.0 \times 10^{10}$ | $6.7 \times 10^9$ | $2.0 \times 10^9$ | $9.3 \times 10^8$ |

Film No. 16, which contains no added antistat in the wear layer, shows the same performance electrically when the thickness is between 10 and 20 mils (0.010–0.020 inches) at 15% RH. At 30 mils (0.030 inches) thickness, the electrical performance appears poorere at 15% RH but superior at 50% RH.

On the other hand, Film No. 18 which contained 2.4 phr of a quat anti-stat (Larostat 477) provides about one order of magnitude better (more conductive) performance at 15% RH than Film No. 16. The data suggests that when the antistat is used, the best conductivity is at 10 and 30 mils in layer thickness and poorest at 20 mils in thickness with the poorest again noted at 20 mils layer thickness.

EXAMPLE 10

Using the procedures described previously, PVC plastisols were prepared according to the formulations described below. The same amount of the identical pigment combination was used for each layer in the formulation. The interlayer formulation was drawn down onto the glass scrim at 55 g/m² (grams/meter²). This layer was fused at 280° F. for one minute. The wear layer was then drawn down on to the interlayer at a thickness 55 g/m². The layer was then fused at 375° F. for 1.5 minutes.

The backcoating layer was then drawn down onto the glass scrim at 55 g/m² and this layer was fused at 300° F. for two minutes. The surface resistivities are given below. In all layers, the white pigment paste used was 50% by weight 2-ethylhexyl phthalate and 50% by weight TiO₂.

It will be appreciated that the order of laying the back coating, the wear layer, and even the interlayer could optionally have been changed. For example, the back coating could be put or formed on the carrier surface and fused and then the interlayer surface laid.

In the formulations given below the flexibilizer and viscosity reducer 2,2,4-trimethyl-1,3-pentandiol monoisobuterate is abbreviated as diol isobuterate

| I. The interlayer on glass scrim. | |
|---|---|
| PVC resin Vestolit B-7021 | 80 |
| PVC Resin Vinnol C6SV | 20 |
| Filler Al₂O₃.3H₂O | 90 Phr |
| Diol Isobuterate | 20 Phr |
| Di-2-ethylhexylphthalate | 50 Phr |
| Epoxidized soybean oil | 5 Phr |
| Dibutyl maleate tin stabilizer | 2 Phr |
| Antistat (Larostat 477) | 12 Phr |
| White pigment paste | 1 Phr |
| Blue pigment paste 147314 | 0.04 |
| II. The wear layer on the interlayer. | |
| PVC Resin 1734 | 100 |
| Diol isobuterate | 11 Phr |
| di-2-ethylhexylphthlate | 28 Phr |
| epoxidized soybean oil | 5 Phr |
| dibutyl maleate tin stabilizer | 2 Phr |
| Antistat (Larostat 477) | 4.8 |
| White Pigment Paste | 1 Phr |
| Blue pigment paste | 0.04 |
| III. Back coat under the glass scrim. | |
| PVC Resin (Vestolit - B7021) | 80 |
| PVC Resin (Vinnol - C6SV) | 20 |
| Filler Al2O3.3H2O | 90 Phr |
| diol iosbuterate | 20 Phr |
| Di-2-ethyl hexyl phthalate | 50 Phr |
| epoxidized soybean oil | 5 Phr |
| dibutyl maleate tin stabilizer | 2 Phr |
| antistat (Larostat 477) | 5 Phr |
| White pigment paste | 1 Phr |
| Blue pigment paste | 0.04 |
| Surface Resistivity | |
| 50% relative humidity | $3.5 \times 10^8$ ohms/sq. |
| 15% relative humidity | $2.4 \times 10^9$ ohms/sq. |

What is claimed is:

1. A surface covering having a reduced surface resistivity which minimizes or avoids unattractive appearances that are characteristic of the combination of cationic anti-stats with polyvinyl chloride, comprising a sheet material having a top wear layer, said wear layer including a polymer of vinyl chloride, a stabilizer, and a plasticizer; and an interlayer of a plastisol formulation, said plastisol formulation including a polymer of vinyl chloride, a filler, a stabilizer, a plasticizer, and a quaternary ammonium salt anti-stat additive, wherein the anti-stat additive is present in the interlayer in an amount of at least about 3 parts per hundred parts of polymer, said amount being effective to increase the static dissipative rate of the wear layer wherein the wear layer either: (1) has no added anti-stat, (2) has only a non-ionic anti-stat in an amount of from about 2 to about 4 parts per hundred parts of polymer, (3) is pigmented and has a quaternary ammonium salt anti-stat in an amount less than about 5.5 parts per hundred parts of polymer, or (4) is clear and has a quaternary ammonium salt anti-stat in an amount less than about 2.5 parts per hundred parts of polymer; and further wherein the interlayer contains more quaternary ammonium salt antistat than is contained in the wear layer.

2. A covering as described in claim 1 wherein the interlayer is resting on either (a) a permanent carrier substrate, or (b) a release paper.

3. A covering as described in claim 1 wherein the filler in the interlayer is selected from the group consisting of: alumina trihydrate, zinc oxide, magnesium oxide, and calcium silicate.

4. A covering as described in claim 2 wherein the interlayer contains the filler at an amount in the range of from about 50 to about 140 parts per hundred parts of polymer, and further contains from about 20 to about 80 parts of plasticizer, and from about 0.5 to about 5 parts of stabilizer per hundred parts of polymer, and wherein the wear layer has from about 20 to about 50 parts of plasticizer, and from about 0.5 to about 5 parts of stabilizer per hundred parts of polymer.

5. A covering as described in claim 4 which is on the permanent carrier substrate and is a floor covering wherein the quaternary ammonium salt anti-stat of the interlayer is present at an amount in the range of from about 4.5 to about 20 parts per hundred parts of polymer.

6. A covering as described in claim 5 wherein there is a backcoat layer under the permanent carrier substrate.

7. A covering as described in claim 6 wherein the backcoat has a thickness in the range of from about 15 to about 40 mils the interlayer has a thickness of from about 10 to about 40 mils, and the wear layer has a thickness in the range of from about 5 to about 35 mils.

8. A covering as described in claim 6 wherein the backcoat has an antistat agent in an amount less than about 10 parts per hundred parts of polymer.

9. A covering as described in claim 5 wherein the filler in the interlayer is either alumina trihydrate or calcium silicate.

10. A covering as described in claim 6 wherein both the wear layer and the interlayer have an adipate plasticizer which is present in an amount of about 50% or less by weight of the total amount of plasticizer.

11. A covering as described in claim 4 having the permanent carrier substrate further providing that the interlayer was fused at a temperature in the range of from about 275° to about 299° F. for a period of from about one minute to about 30 seconds, and the wear layer was fused at a temperature of from about 300° to about 400° F. for a period of from about three minutes to about 45 seconds.

12. A process for a polyvinyl chloride surface covering having an increased capacity to dissipate an electric charge comprising: (1) laying, on a permanent carrier, an interlayer of a plastisol, said plastisol including a polymer of vinyl chloride, a filler, a stabilizer, a plasticizer, and a quaternary ammonium salt anti-stat additive, wherein the anti-stat additive is present in the interlayer in an amount of at least about 3 parts per hundred parts of polymer, and (2) fusing the interlayer for a period of from about one minute to about 30 seconds at a temperature in the range of from about 275° to about 299° F.; and (3) laying on the interlayer, a wear layer of a plastisol formulation that includes a polymer of vinyl chloride, a stabilizer, and a plasticizer, wherein the wear layer either: (a) has no added anti-stat, (b) has only a non-ionic anti-stat in an amount of from about 2 to about 4 parts per hundred parts of polymer, (c) is pigmented, and has a quaternary ammonium salt anti-stat in an amount less than about 5.5 parts per hundred parts of polymer, or (d) is clear and has a quaternary ammonium salt anti-stat in an amount less than about 2.5 parts per hundred parts of polymer; and further wherein the interlayer contains more quaternary ammonium salt antistat than the wear layer, the amount of quaternary ammonium anti-stat in the interlayer being effective to increase the static dissipative rate of the wear layer and (4) fusing the wear layer for a period of from about three minutes to about 45 seconds at a temperature of from about 300° F. to about 400° F.

13. The process of claim 12 wherein a print layer is put on the fused interlayer before the wear layer, further providing that the wear layer is clear with either no antistat added, or with less than about 2.5 parts of antistat per hundred parts of polymer.

14. The process of claim 12 wherein there is a pigment in (a) the plastisol of the wear layer or (b) the plastisol of the interlayer or (c) in both the wear layer and the interlayer plastisol.

15. The process of claim 12 wherein a backcoat layer is laid on the permanent carrier and is then fused.

16. A floor covering having a reduced surface resistivity which minimizes or avoids unattractive appearances that are characteristic of the combination of cationic anti-stats with polyvinyl chloride, comprising a sheet material having a top wear layer, said wear layer including a polymer of vinyl chloride, from about 0.5 to about 5 parts of a stabilizer, and from about 20 to about 50 parts of a plasticizer per hundred parts of polymer; and an interlayer of a plastisol formulation, said plastisol formulation including a polymer of vinyl chloride, from about 50 to about 140 parts of a filler, from about 0.5 to about 5 parts of a stabilizer, and from about 20 to about 80 parts of a plasticizer, and a quaternary ammonium salt anti-stat additive in an amount of from about 4.5 to about 20 parts per hundred parts of polymer, said amount of the quaternary ammonium salt being effective to increase the static dissipative rate of the wear layer, wherein the wear layer either: (1) has no added anti-stat, (2) has only a non-ionic anti-stat in an amount of from about 2 to about 4 parts per hundred parts of polymer, (3) is pigmented and has a quaternary ammonium salt anti-stat in an amount less than about 5.5 parts per hundred parts of polymer, or (4) is clear and has a quaternary ammonium salt anti-stat in an amount less than about 2.5 parts per hundred parts of polymer and further wherein the interlayer contains more quaternary ammonium salt antistat than is contained in the wear layer; wherein further, the interlayer was fused at a temperature in the range of from about 275° to about 299° F. for a period of from about 1 minute to about 30 seconds, and the wear layer was fused at a temperature of from about 300° to about 400° F. for a period of from about 3 minutes to about 45 seconds.

17. The covering of claim 16 wherein the interlayer is resting on either (a) a permanent carrier substrate, or (b) a release paper.

18. The covering of claim 16 wherein the filler in the interlayer is selected from the group consisting of: alumina trihydrate, zinc oxide, magnesium oxide, and calcium silicate.

19. The covering of claim 17 wherein the substrate is on the permanent carrier substrate and where there is a backcoat layer under the permanent carrier substrate.

20. A covering as described in claim 17 having (a) the print layer wherein the print layer was made by a rotogravure printing method.

21. The process of claim 13 wherein the print layer is put on the interlayer by a rotogravure process.

22. The process of cliam 12, wherein the permanent carrier is a glass scrim.

* * * * *

UNITED STATES PATENT AND TRADEMARK OFFICE
CERTIFICATE OF CORRECTION

PATENT NO.  : 5,073,425
DATED       : December 17, 1991
INVENTOR(S) : Martin Dees, Jr. et al It is certified that error appears in the above-identified patent and that said Letters Patent is hereby corrected as shown below:

In column 11, line 14, "rotation" should read --portion--.

In the claims, claim 10 at column 21, line 29, "claim 6" should read --claim 5--.

Signed and Sealed this

Twenty-third Day of March, 1993

Attest:

STEPHEN G. KUNIN

*Attesting Officer*    Acting Commissioner of Patents and Trademarks